United States Patent Office 3,125,406
Patented Mar. 17, 1964

3,125,406
CREASE-PROOFED CELLULOSIC FABRICS AND
PROCESS FOR MAKING THEM
John J. Herman, Trenton, N.J., assignor to Rohm &
Haas Company, Philadelphia, Pa., a corporation of Delaware
No Drawing. Filed Feb. 28, 1961, Ser. No. 92,168
7 Claims. (Cl. 8—116.3)

The present invention concerns the treatment of cellulose fabrics, and particularly an improved process for creaseproofing such fabrics.

A copending United States application for patent of Gardon, Serial No. 819,009, filed June 9, 1959, discloses the creaseproofing of cellulose fabrics by the application thereto of N-methylol-acrylamide, and then causing reaction of the latter with the cellulose to etherify the latter and with itself to effect addition polymerization, the etherification being effected simultaneously or in consecutive stages in either order.

In accordance with the present invention, it has been found that improved results can be obtained by effecting the reactions of the N-methylol-acrylamide in a special manner involving a preliminary stage of simultaneous etherification of the cellulose and addition polymerization, and a final stage of etherification under acidic conditions with a special intermediate step of substantially reducing the amount of, or removing entirely, the extractable portion of unreacted monomer and/or residual free-radical initiator before carrying out the final stage of etherification.

To carry out the process of the present invention the cellulose fabric is impregnated with the N-methylol-acrylamide and a free radical initiator which is of acidic character or, if not acidic, is supplemented by an acidic catalyst. The N-methylol-acrylamide may be applied in aqueous solutions at concentrations of 5 to 25% or more with wet pick-up controlled to provide an increase in weight of the fabric ranging from about 5 to 20% or more. The optimum proportion is generally from about 12 to 16% increase in weight of the fabric. The proportion of initiator which may be employed ranges from 1 to 10% by weight, based on the weight of total monomer (including any other monomer intended to be copolymerized in situ with the acrylamide monomer). When the initiator is supplemented with an acid or acidic material, the amount thereof may range from 0.1% to 3% by weight, preferably 0.5% to 2%, based on the weight of total solution and the amount of acidic catalyst may be about 0.05% to 1% by weight of the solution.

The free-radical initiator employed is soluble in water or in a single-phase solution containing at least 20% water, such as mixtures of water with an alcohol, e.g., methanol or ethanol, or with a ketone, such as acetone. The initiator is preferably of water-soluble character so that it can readily effect polymerization in a completely aqueous medium. Preferred examples include ammonium persulfate and the alkali metal persulfates. These catalysts also are acid in character so that they serve to polymerize the monomer and also to react the methylol groups with the hydroxyls of the cellulose. The use of these catalysts or initiators is accordingly quite advantageous since they do not require the inclusion of additional acid though, if desired, small amounts of additional acid may be included in order to effect simultaneous vinyl polymerization and etherification reactions.

A modification may involve the use of an acidic catalyst and a neutral initiator such as azodiisobutyronitrile which latter, because of its water-insolubility, requires application by way of an organic solvent which is miscible with water.

Examples of acidic catalysts that may be employed include sodium bisulfate, ammonium chloride, the salts of mineral acids such as hydrochloric and sulfuric acid with amines such as 2-methyl-2-aminopropanol-1 para-toluenesulfonic acid, oxalic acid, lactic acid, acetic acid, and the like.

After impregnation of the cellulose fabric with the N-methylol acrylamide and either the initiator of acidic character or a mixture of a non-acidic free radical polymerization initiator and an acidic catalyst, the fabric may be squeezed to remove excess impregnant or, in other words, to control or predetermine the amount of impregnant remaining on the fabric. Then the impregnated fabric is heated to effect drying and simultaneous addition polymerization of the N-methylol acrylamide and etherification of the cellulose with the N-methylolacrylamide and/or with the polymers thereof formed during the reactions, which polymers may be of simple addition type, of condensation type (by virtue of cellulose etherification) and/or of a combination addition condensation type.

The heating during this preliminary stage of reaction may be effected in an oven or tunnel drier at a temperature of about 90° C. to 175° C. but preferably is in the range of about 110° C. to 150° C. It is preferred to carry out the heating with a relatively low rate of air flow, such as $3 \times 10^{-7}$ liters or less per minute per square meter of cross-section of the oven or tunnel, which may simply be the air flow caused by natural convection currents.

The duration of this first stage of simultaneous reaction may be varied. In general, it may be terminated as soon as the fabric attains a substantially dry condition, i.e., a condition in which it contains no more than 10% by weight of moisture on the dry weight of the fabric, or preferably after a state is reached in which the fabric contains no moisture whatsoever. On the other hand, the heating and reaction may be extended several minutes beyond the attainment of a substantially dry condition depending on the temperature. At a temperature of 155° C. heating may be effected for 5 to 10 minutes beyond the condition of substantial dryness, whereas at a temperature of 90° C., an extended period of 15 to 30 minutes may be used. In general, however, the period of heating beyond substantial dryness is preferably not over 5 minutes even at the lower range of temperature mentioned.

The termination of the first or preliminary reaction stage may simply be effected by cooling and/or by applying a rinsing bath either by spraying the bath on the fabric or immersing the fabric in the bath. The rinsing bath may simply be water when the monomer and free radical initiator are of water-soluble character or it may be an aqueous solution containing a suitable water-miscible organic solvent for the monomer or the initiator or both. The temperature of the rinsing bath may be from 5° C. to 80° C., ordinary room temperature (20° C.) or somewhat higher up to 30° C. usually being quite practical. The rinsing should be adequate to remove all of the readily removable portions of the various extractable materials, especially monomer and initiator, and is preferably long enough in time to remove as much as is practical of the monomer and initiator. A minimum period of 15 seconds is ordinarily needed and periods up to 1 to 5 minutes generally provide adequate removal of monomer and initiator except for some instances wherein the first-stage reaction period has been carried to its maximum limit.

After rinsing has removed monomer and initiator to the desired extent, the fabric is impregnated with an acidic catalyst which is not a free radical initiator. As in the first stage of the reaction, this acidic catalyst may be applied to the fabric by treatment thereof with an aqueous solution containing 0.1% to 3% by weight of the acidic catalyst, and preferably 0.5 to 2% by weight thereof. This solution, if desired, may also contain a salt having high solubility in water and a normal solubility curve (increasing solubility with an increasing temperature) such as sodium or potassium nitrate or calcium bromide, in a concentration from about 1% up to saturation and preferably about 5% to 20%. The presence of the salt enhances the crease-proofing effect for a given amount of catalyst. Then the fabric is heated in an oven or tunnel at a temperature of about 125° C. to 175° C. to effect additional etherification of the hydroxyl groups in the cellulose with methylol groups. This reaction may be prolonged up to a half hour or more as desired, but periods of ½ minute to 10 minutes beyond substantial dryness are generally most desirable. Again, the use of relatively low air flow here, as in the first stage, is preferred because it provides greater wet crease-recovery in the final fabric.

In general, the N-methylol-acrylamide serves quite well when the cellulose material is impregnated with it as the only polymerizable material so that in effect, homopolymers thereof serve to cross-link the cellulose molecules. However, the properties of the product can be modified by including one or more additional monomers which do not react with the cellulose so that in effect, a copolymer of the N-methylol-acrylamide reacts with the cellulose. Examples of comonomers (which must have appreciable solubility in water or in a single-phase aqueous medium containing 20% water as mentioned above in connection with the initiator) that can be employed include acrylonitrile, acrylic acid, acrylamide itself methylene-bis-acrylamide, vinyl pyrrolidinone, vinyl acetate, and esters of acrylic acid or methacrylic acid with alcohols having from 1 to 8 or more carbon atoms. Examples of such esters include methyl acrylate, ethyl acrylate, butyl acrylate, 2-ethylhexyl acrylate, butyl methacrylate, and 2-ethylhexyl methacrylate. Some monomers which have low water-solubility but which are soluble in another comonomer, such as 1-vinyl-2-pyrrolidinone, can be dissolved in the latter comonomer and then added to the aqueous medium by which it is to be applied to the fabric. The relative proportions between the N-methylol-acrylamide and the other monomer or monomers may vary widely. However, it is preferred that at least 50% by weight of the monomer mixture be N-methylol-acrylamide.

The treatment of the present invention may be applied to any textile material containing cellulosic fibers or yarns and the textile material may be in the form of woven or knitted fabrics, or "non-woven" fabrics derived from carded webs or from fibrous or filamentous webs obtained in any suitable fashion, such as air-deposition, wherein the fibers or filaments are distributed in a random array. The treatment may also be applied to yarns, threads, or other plied structures, or it may be applied to fibers or filaments in the form of loose or bulk masses or in the form of more or less compacted webbing, matting, or batting. In all fibrous structures having the fibers in heterogeneous array, the treatment renders the textile more resilient.

The fabrics or fibrous masses that may be treated are preferably those which contain a predominant proportion of cellulosic fibers and/or filaments, by which is meant that the cellulosic fibers constitute more than 50% of the total fibers by weight. The process of the present invention is particularly useful with textile materials of cotton, viscose rayon, cuprammonium cellulose rayon, linen, ramie, as well as textile materials comprising fibers and filaments of two or more of such cellulosic materials. At the time of treatment with the cross-linking agent of the present invention, the fabric may be in the greige state or it may have been previously bleached, dyed, and/or printed or otherwise finished.

If desired, the treatment with the N-methylol-acrylamide may be supplemented by a treatment with a hand-modifier or builder, softener, or water-repellent agents. Such modifying agents may be applied simultaneously by way of the same aqueous solution of the N-methylol-acrylamide or they may be applied to the fabric before or after the application of the N-methylolacrylamide by a separate operation. If desired, the modifying agent may be applied in the solution of acidic catalyst when the latter is applied immediately prior to the final reaction stage.

As water-repellent materials which also serve to soften the textile material, there may be used those quaternary ammonium compounds having a long-chain hydrocarbon group, such as stearamidomethylpyridinium chloride, stearyl pyridinium chloride, octadecyloxymethylpyridinium chloride, and the various quaternary ammonium salts described in United States Patent 2,351,581. The amount of water-repellent or softener may be as much as 5% and is preferably in the range of about 1 to 3% in the aqueous medium by which it is applied, assuming 100% wet pick-up. When it is applied solely for the purpose of softening, there may be employed as little as 0.1%.

Examples of auxiliary agents for enhancing the crease-resistance, for hand-building, for increasing tear strength, or for improving abrasion-resistance which can be applied in aqueous media include aqueous dispersions of water-insoluble linear addition polymers of one or more monoethylenically unsaturated monomeric compounds. Examples include water-insoluble copolymers of 0.5 to 8% by weight of acrylic acid, methacrylic acid, and itaconic acid. Any one or more of these monoethylenically unsaturated acids may be copolymerized with one or more other copolymerizable compounds containing a single vinylidene group, such as esters of acrylic acid or methacrylic acid and monohydric alcohols such as methyl, ethyl, butyl, octyl, dodecyl, cyclohexyl, cyanoethyl, aminoethyl, and the like; esters of itaconic acid and the above alcohols; esters from maleic, fumaric, or citraconic acids, and the above alcohols; vinyl esters of carboxylic acids such as acetic, propionic, butyric, and the like; vinyloxyalkyl esters such as vinyloxyethyl acetate, etc.; vinyl ethers such as ethyl vinyl ether, butyl vinyl ether, octyl vinyl ether, hydroxyethyl vinyl ether, aminoethyl vinyl ether, aminopropyl vinyl ether, dimethylaminoethyl vinyl ether, vinyloxyethoxyethanol, vinyloxypropoxyethanol; methacrylonitrile or acrylonitrile; acrylamide, or methacrylamide, and N-substituted amides of these types: vinyl chloride, vinyl bromide, vinylidene chloride, vinylidene fluoride, 1-chloro-1-fluoroethylene, ethylene, styrene, 2-vinylpyridine, 4-vinylpyridine, 2-methyl-5-vinylpyridine. These water-insoluble copolymers may be dispersed by means of non-ionic dispersing agents, such as alkylphenoxyethoxyethanols having alkyl groups of about seven to eighteen carbon atoms and six to sixty or more oxyethylene units, such as heptylphenoxypolyethoxyethanols,
octylphenoxypolyethoxyethanols,
methyloctylphenoxypolyethoxyethanols,
nonylphenoxypolyethoxyethanols,
dodecylphenoxypolyethoxyethanols, and the like; polyethoxyethanol derivatives of methylene linked alkyl phenols; sulfur-containing agents such as those made by condensing six to sixty or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil containing six to sixty oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing six to sixty oxyethylene units, etc.; block copolymers of ethylene oxide and propylene oxide comprising a hydrophobic propylene oxide section combined with one or more hydrophilic ethylene oxide sections. The concentration of the water-insoluble polymer may be from ½ to 5% in the aqueous medium by which it is applied, either simultaneously with the N-methylol-acrylamide or before or after the application of the N-methylol-acrylamide. These auxiliary agents may be used in amounts which serve to modify the hand from a soft to a firm or stiff hand depending upon what is desired and depending upon the selection of comonomers used in any copolymer thus applied.

The fabric treated in accordance with the present invention may be a dyed fabric but, if not, the pigments and/or dyes may be included in the aqueous solution used to apply the cross-linking agent or any other auxiliary treating agent. A dye or pigment may be applied by printing or dyeing the fabric after the completion of the crease-proofing treatment of the present invention.

Instead of N-methylol-acrylamide, N-methylol derivatives of the amides of methacrylic acid, fumaric acid, maleic acid, itaconic acid, or of the dimer of methacrylic acid, may be employed. Also useful are: N-methyl-N-methylol-acrylamide, the corresponding N-methyl-N-methylol derivatives of the amides of the acids just mentioned, and the methylated derivatives of any of the methylol derivatives mentioned in this paragraph, such as N-methoxymethylacrylamide and N-methoxymethyl-methacrylamide. These compounds may be represented by the general formula:

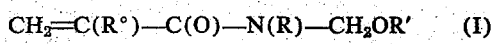

$$CH_2{=}C(R°)-C(O)-N(R)-CH_2OR' \quad (I)$$

where R, R°, and R' are individually selected from the group consisting of hydrogen and methyl.

Essentially the product of the present invention is a textile material formed of cellulosic fibers cross-linked by an acrylic addition polymer, the cellulose and the polymer of the cross-linked product being joined by a plurality of linkages of the formula

$$-O-CH_2-N(R)-C(O)- \quad (II)$$

in which the carbon atom of the carbonyl group is attached directly to the carbon atom backbone or main chain of the acrylic polymer and the ether oxygen atom is connected directly to the cellulose residue. R may be hydrogen or a methyl group. It is to be understood that the invention is not to be limited to the theory presented herein as to how and why the improvements are attained.

The procedure of the present invention provides products of improved character in that they have better strength, show less discoloration, and are subject to little or no damage as a result of treatments using conventional chlorine or hypochlorite bleaching agents and subsequent drying or ironing. It appears that removal of the free radical initiator before the final reaction stage accounts for the improved color and strength and the removal of monomer accounts for the minimization or elimination of susceptibility to chlorine damage. The use of the rinsing or extraction step to remove monomer is essential for obtaining the improved results of the present invention. When elimination of monomer is effected merely by prolongation of the first reaction stage beyond the limits set out hereinbefore, it appears that the N-methylol-acrylamide reacts with the fabric or with the polymer already combined therewith in such a way that it can no longer be removed by extraction yet the fabric is susceptible to severe chlorine damage.

The procedure of the present invention provides improvement in both dry and wet crease-recovery properties of cellulose fabric and it may be controlled to provide a wide range of desired ratios between wet and dry crease-recovery qualities. Increasing the time of heating after attaining substantial dryness in the first reaction stage increases the dry crease-recovery values. Adjusting conditions, e.g., air flow, to prolong the time required to attain substantial dryness in the first reaction stage increases the wet crease recovery values. The process of the present invention involving removal of residual catalyst after the first reaction step is especially advantageous with catalysts which, because of high acidity or strong oxidizing action, have a tendency to harm the cellulosic fabric when allowed to remain in contact therewith. The persulfates are of this character.

In the following examples, which are illustrative of the present invention, the parts and percentages are by weight unless otherwise indicated. The tests whose results are given in the examples are performed on the treated fabric after being conditioned at 70° F. and 65% relative humidity. The grab tensile strength is given in pounds. The dry crease-recovery angle is the angle obtained by the Shirley method of testing therefor. Before testing, the fabrics were given one wash in an automatic home washer. The chlorine damage is determined by the AATCC Tentative Test Method 92–1958.

EXAMPLE 1

A solution containing 15% N-methylol-acrylamide, 0.75% ammonium persulfate, and 0.42% 2-methyl-2-amino-propanol-1-hydrochloride was applied to 80 x 80 cotton fabric which then was squeezed to 80% wet pick-up, framed to dimensions, and heated for 1.5 minutes at 160° C. The dried fabric was rinsed in running water at 25° C. for 10 minutes, then allowed to dry at room temperature. Next, a solution containing 0.5% zinc nitrate and 10% sodium nitrate was applied to the fabric. After squeezing to 80% wet pick-up, the fabric was framed and heated for 1.5 minutes at 163° C.

*Properties*

| Dry Crease Recovery, degrees | | Wet Crease Recovery, degrees | Grab Tensile | | Chlorine damage test |
|---|---|---|---|---|---|
| Warp | Fill | Warp | Warp | Fill | Percent Loss (Tensile Strength) |
| 134 | 139 | 138 | 43 | 22 | 0 |

Similar results are obtained when the ammonium persulfate is replaced by sodium or potassium persulfate.

When the same 80 x 80 cotton fabric is crease-proofed in a one-stage process by applying at 80% wet pick-up the same ammonium persulfate solution as above and then heating for 5 minutes at 160° C. the following properties are obtained:

| Dry Crease Recovery, degrees | Wet Crease Recovery, degrees | Grab Tensile | | Chlorine damage test |
|---|---|---|---|---|
| Average of Warp and fill | Warp | Warp | Fill | Percent Loss (Tensile Strength) |
| 140 | 140 | 37 | 16 | 18 |

EXAMPLE 2

A solution containing 15% N-methylol-acrylamide, 0.75% ammonium persulfate, and 0.42% 2-methyl-2-amino-propanol-1-hydrochloride was applied to 80 x 80 cotton which then was squeezed to 80% wet pick-up, framed, and heated for 4 minutes at 105° C. The dried, framed fabric was rinsed in running water at 25° C. for 10 minutes, then allowed to dry at room temperature. Next, a solution containing 0.68% zinc nitrate and 2.5% zinc chloride was applied to the fabric. After squeezing to 80% wet pick-up, the fabric was framed and heated for 10 minutes at 127° C.

Properties

| Dry Crease Recovery, degrees | | Wet Crease Recovery, degrees | | Grab Tensile | | Chlorine damage test |
|---|---|---|---|---|---|---|
| Warp | Fill | Warp | | Warp | Fill | Percent Loss (Tensile Strength) |
| 137 | 137 | 133 | | 39 | 18 | 2 |

EXAMPLE 3

A solution containing 25% N-methylol-acrylamide, 1.25% ammonium persulfate, and 0.7% 2-methyl-2-amino-propanol-1-hydrochloride was applied to 80 x 80 cotton which then was squeezed to 80% wet pick-up, framed, and heated for 5 minutes at 105° C. The dried fabric was rinsed in running water at 25° C. for 10 minutes, then allowed to dry at room temperature. Next, a solution containing 0.68% zinc nitrate and 10% sodium nitrate was applied to the fabric. After squeezing to 80% wet pick-up, the fabric was framed and heated for 2 minutes at 170° C.

Properties

| Dry Crease Recovery, degrees | Wet Crease Recovery, degrees | Grab Tensile | | Chlorine damage test |
|---|---|---|---|---|
| Warp | Warp | Warp | Fill | Percent Loss (Tensile Strength) |
| 153 | 148 | 43 | 17 | 7 |

EXAMPLE 4

A solution containing 15% N-methylol-acrylamide, 0.75% ammonium persulfate, and 0.42% 2-methyl-2-amino-propanol-1-hydrochloride was applied to 80 x 80 cotton which then was squeezed to 80% wet pick-up, framed, and heated for 4 minutes at 105° C. The dried fabric was rinsed in running water at 35° C. for 60 minutes, then allowed to dry at room temperature. Next, a solution containing 0.51% zinc nitrate and 20% potassium nitrate was applied to the fabric. After squeezing to 80% wet pick-up, the fabric was framed and heated for 5 minutes at 150° C.

Properties

| Dry Crease Recovery, degrees | | Wet Crease Recovery, degrees | Grab Tensile | | Chlorine damage test |
|---|---|---|---|---|---|
| Warp | Fill | Warp | Warp | Fill | Percent Loss (Tensile Strength) |
| 135 | 135 | 130 | 41 | 23 | 7 |

I claim:
1. A process of treating a fabric of cellulose fibers which comprises impregnating the fabric with an aqueous solution containing 5 to 30% by weight of a monomeric compound of the formula

$$CH_2=C(R°)-C(O)-N(R)-CH_2OR'$$

wherein R, R°, and R' are individually selected from the group consisting of hydrogen and methyl, and acidic catalytic material dissolved in the aqueous medium selected from the group consisting of (1) a free-radical polymerization initiator of acidic character at a concentration of $\frac{1}{10}$ to 3% by weight and (2) a mixture of a free-radical polymerization initiator selected from the group consisting of neutral and acidic initiators at a concentration of $\frac{1}{10}$ to 3% by weight and, at a concentration of about 0.05 to 1% by weight, an acidic catalyst, other than a free-radical polymerization initiator, for the etherification reaction of —OR' groups of the aforesaid compound with hydroxyl groups of cellulose, heating the impregnated fabric at a temperature of about 90° to 175° C. until the moisture content of the fabric has been reduced at least to a value which is no more than 10% by weight based on the dry weight of the fabric to effect reaction of monomer including addition polymerization thereof and cross-linking of the cellulose by an etherification reaction of —OR' groups with hydroxyl groups of the cellulose, then terminating the preceding reaction step before all of the aforesaid monomeric compound has been reacted, rinsing the fabric to remove extractable material including residual monomeric compound and free-radical initiator, thereafter contacting the fabric with an aqueous solution of an acidic catalyst, other than a free-radical polymerization initiator, for the etherification reaction, and heating the fabric thus obtained at a temperature of 125° C. to 175° C. to effect additional etherification reaction within the fabric.

2. A process of treating a fabric of cellulose fibers which comprises impregnating the fabric with an aqueous solution containing a monomeric compound of the formula $$CH_2=C(R°)-C(O)-N(R)-CH_2OR'$$

wherein R, R°, and R' are individually selected from the group consisting of hydrogen and methyl, and $\frac{1}{10}$ to 3% by weight of an alkali metal persulfate, heating the impregnated fabric at a temperature of about 90° to 175° C. until the moisture content of the fabric has been reduced at least to a value which is no more than 10% by weight based on the dry weight of the fabric to effect reaction of monomer including addition polymerization thereof and cross-linking of the cellulose by an etherification reaction of —OR' groups with hydroxyl groups of the cellulose, then terminating the preceding reaction step before all of the aforesaid monomeric compound has been reacted, rinsing the fabric to remove extractable material including residual monomeric compound and persulfate, thereafter contacting the fabric with an aqueous solution of an acidic catalyst, other than a free-radical polymerization initiator, for the etherification reaction, and heating the fabric thus obtained at a temperature of 125° C. to 175° C. to effect additional etherification reaction within the fabric.

3. A process of treating a fabric of cellulose fibers which comprises impregnating the fabric with an aqueous solution containing a monomeric compound of the formula $$CH_2=C(R°)-C(O)-N(R)-CH_2OR'$$

wherein R, R°, and R' are individually selected from the group consisting of hydrogen and methyl, and $\frac{1}{10}$ to 3% by weight of an ammonium persulfate, heating the impregnated fabric at a temperature of about 90° to 175° C. until the moisture content of the fabric has been reduced at least to a value which is no more than 10% by weight based on the dry weight of the fabric to effect reaction of monomer including addition polymerization thereof and cross-linking of the cellulose by an etherification reaction of —OR' groups with hydroxyl groups of the cellulose, then terminating the preceding reaction step before all of the aforesaid monomeric compound has been reacted, rinsing the fabric to remove extractable material including residual monomeric compound and persulfate, thereafter contacting the fabric with an aqueous solution of an acidic catalyst, other than a free-radical polymerization initiator, for the etherification reaction, and heating the fabric thus obtained at a temperature of 125° C. to 175° C. to effect additional etherification reaction within the fabric.

4. A process of treating a fabric of cellulose fibers which comprises impregnating the fabric with an aqueous solution containing at least 5% by weight of N-methylolacrylamide, and 1/10 to 3% by weight of an alkali metal persulfate, heating the impregnated fabric at a temperature of about 90° to 175° C. until the moisture content of the fabric has been reduced at least to a value which is no more than 10% by weight based on the dry weight of the fabric to effect reaction of monomer including addition polymerization thereof and cross-linking of the cellulose by an etherification reaction of methylol groups with hydroxyl groups of the cellulose, then terminating the preceding reaction step before all of the aforesaid N-methylol-acrylamide has been reacted, rinsing the fabric to remove extractable material including residual N-methylol-acrylamide and persulfate, thereafter contacting the fabric with an aqueous solution of an acidic catalyst, other than a free-radical polymerization initiator, for the etherification reaction, and heating the fabric thus obtained at a temperature of 135° C. to 175° C. to effect additional etherification reaction within the fabric.

5. A process of treating a fabric of cellulose fibers which comprises impregnating the fabric with an aqueous solution containing at least 5% by weight of N-methylolacrylamide, and 1/10 to 3% by weight of an ammonium persulfate, heating the impregnated fabric at a temperature of about 90° to 175° C. until the moisture content of the fabric has been reduced at least to a value which is no more than 10% by weight based on the dry weight of the fabric to effect reaction of monomer including addition polymerization thereof and cross-linking of the cellulose by an etherification reaction of methylol groups with hydroxyl groups of the cellulose, then terminating the preceding reaction step before all of the aforesaid N-methylol-acrylamide has been reacted, rinsing the fabric to remove extractable material including residual N-methylol-acrylamide and persulfate, thereafter contacting the fabric with an aqueous solution of an acidic catalyst, other than a free-radical polymerization initiator, for the etherification reaction, and heating the fabric thus obtained at a temperature of 135° C. to 175° C. to effect additional etherification reaction within the fabric.

6. A process of treating a fabric of cellulose fibers which comprises impregnating the fabric with an aqueous solution containing at least 5% by weight of N-methoxymethylacrylamide, and 1/10 to 3% by weight of an alkali metal persulfate, and then heating the impregnated fabric at a temperature of about 90° to 175° C. until the moisture content of the fabric has been reduced at least to a value which is no more than 10% by weight based on the dry weight of the fabric to effect reaction of monomer including addition polymerization thereof and cross-linking of the cellulose by an etherification reaction of methoxy groups with hydroxyl groups of the cellulose, then terminating the preceding reaction step before all of the aforesaid N-methoxy-methyl-acrylamide has been reacted, rinsing the fabric to remove extractable material including residual N-methoxymethyl-acrylamide and persulfate, thereafter contacting the fabric with an aqueous solution of an acidic catalyst, other than a free-radical polymerization initiator, for the etherification reaction, and heating the fabric thus obtained at a temperature of 135° C. to 175° C. to effect additional etherification reaction within the fabric.

7. A process of treating a fabric of cellulose fibers which comprises impregnating the fabric with an aqueous solution containing at least 5% by weight of N-methoxymethyl-acrylamide, and 1/10 to 3% by weight of ammonium persulfate, and then heating the impregnated fabric at a temperature of about 90° to 175° C. until the moisture content of the fabric has been reduced at least to a value which is no more than 10% by weight based on the dry weight of the fabric to effect reaction of monomer including addition polymerization thereof and cross-linking of the cellulose by an etherification reaction of methoxy groups with hydroxyl groups of the cellulose, then terminating the preceding reaction step before all of the aforesaid N-methoxymethyl-acrylamide has been reacted, rinsing the fabric to remove extractable material including residual N-methoxymethyl-acrylamide and persulfate, thereafter contacting the fabric with an aqueous solution of an acidic catalyst, other than a free-radical polymerization initiator, for the etherification reaction, and heating the fabric thus obtained at a temperature of 135° C. to 175° C. to effect additional etherification reaction within the fabric.

References Cited in the file of this patent

UNITED STATES PATENTS

| | | |
|---|---|---|
| 2,173,005 | Strain | Sept. 12, 1939 |
| 2,216,095 | Britton | Sept. 24, 1940 |
| 2,264,229 | Wallach | Nov. 25, 1941 |
| 2,455,083 | Musser | Nov. 30, 1948 |
| 2,789,030 | Fetscher | Apr. 16, 1957 |
| 2,796,656 | Schappel | June 25, 1958 |
| 2,837,511 | Mantell | June 3, 1958 |
| 2,837,512 | Mantell | June 3, 1958 |
| 2,922,768 | Mino | Jan. 26, 1960 |